United States Patent
Ray et al.

(10) Patent No.: US 9,451,051 B1
(45) Date of Patent: Sep. 20, 2016

(54) METHOD AND PROCEDURE TO IMPROVE DELIVERY AND PERFORMANCE OF INTERACTIVE AUGMENTED REALITY APPLICATIONS OVER A WIRELESS NETWORK

(71) Applicant: Sprint Communications Company L.P., Overland Park, KS (US)

(72) Inventors: Amar N. Ray, Shawnee, KS (US); James P. Sisul, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 247 days.

(21) Appl. No.: 14/179,900

(22) Filed: Feb. 13, 2014

(51) Int. Cl.
| | |
|---|---|
| G06F 15/16 | (2006.01) |
| G06F 15/173 | (2006.01) |
| H04L 29/06 | (2006.01) |
| G06T 15/00 | (2011.01) |

(52) U.S. Cl.
CPC ............ *H04L 67/42* (2013.01); *G06T 15/005* (2013.01); *G06T 2210/08* (2013.01)

(58) Field of Classification Search
CPC ..... G06T 19/006; G06T 1/00; G06T 15/005; G06T 2210/08; H04L 67/42
USPC ................. 709/203, 219, 223–224, 230–232
See application file for complete search history.

(56) References Cited

U.S. PATENT DOCUMENTS

| | | | |
|---|---|---|---|
| 8,636,589 B2 * | 1/2014 | Harris ...................... | A63F 13/12 463/29 |
| 8,803,916 B1 | 8/2014 | Paczkowski et al. | |
| 2009/0210932 A1 | 8/2009 | Balakrishnan et al. | |
| 2011/0157306 A1 | 6/2011 | Lin et al. | |
| 2011/0313953 A1 * | 12/2011 | Lane .................... | G06N 99/005 706/12 |
| 2012/0242798 A1 | 9/2012 | McArdle et al. | |
| 2012/0311130 A1 | 12/2012 | Zadig | |
| 2013/0016176 A1 | 1/2013 | Hines et al. | |
| 2013/0124326 A1 * | 5/2013 | Huang ..................... | G09G 5/00 705/14.64 |
| 2013/0162676 A1 | 6/2013 | Taylor | |
| 2013/0178257 A1 * | 7/2013 | Langseth ................ | G06T 17/05 463/4 |
| 2013/0187953 A1 | 7/2013 | Matsumura et al. | |
| 2013/0225288 A1 * | 8/2013 | Levin ....................... | A63F 13/06 463/31 |
| 2013/0249948 A1 | 9/2013 | Reitan | |
| 2014/0128161 A1 * | 5/2014 | Latta ....................... | A63F 13/06 463/42 |
| 2015/0193977 A1 * | 7/2015 | Johnson ................ | G06T 19/006 345/419 |
| 2016/0037230 A1 * | 2/2016 | van der Laan ......... | A63F 13/12 463/31 |

OTHER PUBLICATIONS

FAIPP Pre-Interview Communication dated Jan. 7, 2014, U.S. Appl. No. 13/463,756, filed May 3, 2012.
Notice of Allowance dated Mar. 24, 2014, U.S. Appl. No. 13/463,756, filed May 3, 2012.

* cited by examiner

Primary Examiner — Farzana Huq

(57) ABSTRACT

A system for improving performance of an interactive augmented reality application over a wireless network. The system comprises at least one client side gateway configured to establish and adjust timing and synchronization with a client application based on measurements and predicted performance of a network between the client application and the client side gateway before a predefined period of time expires, transmit timing and synchronization decision to the controller, execute server side application programming interfaces determined by the controller based on the network quality measurements and the predicted network performance, and transmit execution results of the server side application programming interfaces to the controller.

20 Claims, 8 Drawing Sheets

METHOD AND PROCEDURE TO IMPROVE DELIVERY AND PERFORMANCE OF INTERACTIVE AUGMENTED REALITY APPLICATIONS OVER A WIRELESS NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless networks are becoming increasingly prevalent in our daily lives with the rapid development and popularization of portable network capable devices. Additionally, more and more electronic devices that did not have wireless network capabilities are getting wireless network capable. More and more volume and more and more types of content are transmitted through wireless networks, for example text, emails, audio, and video. Online gaming through wireless network capable devices is also becoming more and more popular.

SUMMARY

In an embodiment, a system for improving performance of an interactive augmented reality application over a wireless network is disclosed. The system comprises at least one server side gateway, at least one client side gateway, and a controller. The at least one server side gateway is configured to establish and adjust timing and synchronization with an application server based on measurements and predicted performance of a network between the application server and the server side gateway before a predefined period of time expires. The at least one server side gateway is further configured to transmit timing and synchronization decision to a controller, and execute client side application programming interfaces (APIs) determined by a controller based on network quality measurements and predicted network performance. The at least one server side gateway is further configured to transmit execution results of the application programming interfaces to the controller. The at least one client side gateway is configured to establish and adjust timing and synchronization with a client application based on measurements and predicted performance of a network between the client application and the client side gateway before a predefined period of time expires. The at least one client side gateway is further configured to transmit timing and synchronization decision to the controller, and execute server side application programming interfaces determined by the controller based on the network quality measurements and the predicted network performance. The at least one client side gateway is further configured to transmit execution results of the server side application programming interfaces to the controller. The controller is configured to initialize, establish, and dynamically determine timing and synchronization for the system based on measurements and predicted performance of different networks in the system.

The controller is further configured to dynamically determine which application programming interfaces to be executed on the client side gateway, the server side gateway, the controller, or a separate server based on the network quality measurements and the predicted network performance. The controller is further configured to adjust thresholds of time periods for the client side gateway and the server side gateway to autonomously make timing and synchronization decisions, and transmit execution results and data between the client side gateway and the server side gateway with proper timing and synchronization.

In an embodiment, a method of improving performance of a real time application over a wireless network is disclosed. The method comprises initializing a system with timing and synchronization information based on data accessed from a data store, keeping records of the timing and synchronization information, and adjusting timing and synchronization for the system by a controller based on network quality measurements and predicted network performance. The method further comprises establishing and adjusting a tickrate with an application server by a server side gateway based on measurements and predicted performance of a network between the application server and the server side gateway before a predefined period of time expires, wherein a tickrate is a rate of ticks per unit of time and during each tick, the application server processes client commands, runs a physical simulation step, checks application rules, and updates object states. The method further comprises establishing and adjusting a tickrate with a client application by a client side gateway based on measurements and predicted performance of a network between the client application and the client side gateway before a predefined period of time expires, wherein the tickrate with the client application can be different from the tickrate between the server side gateway and the application server. The method further comprises transmitting tickrate decisions to the controller, and adjusting, by the controller, thresholds of time periods for the client side gateway and the server side gateway to autonomously make timing and synchronization decisions. The method further comprises dynamically determining which application programming interfaces (APIs) to be executed on the client side gateway, the server side gateway, the controller, or a separate server based on the network quality measurements and the predicted network performance. The method further comprises executing client side application programming interfaces by the server side gateway as determined by the controller based on the network quality measurements and the predicted network performance. The method further comprises executing server side application programming interfaces by the client side gateway as determined by the controller based on the network quality measurements and the predicted network performance. The method further comprises transmitting execution results of the locally executed application programming interfaces to the controller by the client side gateway and the server side gateway. The method further comprises compressing execution results and data by the controller for delivery between the client side gateway and the server side gateway with proper timing and synchronization.

In an embodiment, a method of improving performance of a real time application over a wireless network is disclosed. The method comprises establishing timing and synchronization for the system by a controller based on network quality measurements and predicted network performance. The method further comprises establishing and adjusting a timing and synchronization rate with an application server by a server side gateway based on measurements and predicted performance of a network between the application server and the server side gateway before a predefined period of time expires. The method further comprises establishing and adjusting a timing and synchronization rate with a client application by a client side gateway based on measurements and predicted performance of a network between the client application and the client side gateway before a predefined period of time expires, wherein the timing and synchronization rate with the client application can be different from the timing and synchronization rate between the server side gateway and the application server. The method further comprises transmitting timing and synchronization decisions to the controller, and determining which application programming interfaces to be executed on the client side gateway, the server side gateway, the controller, or a separate server based on local environment. The method further comprises executing client side application programming interfaces (APIs) by the server side gateway as determined by the controller based on the network quality measurements and the predicted network performance. The method further comprises executing server side application programming interfaces by the client side gateway as determined by the controller based on the network quality measurements and the predicted network performance. The method further comprises transmitting execution results of the locally executed application programming interfaces to the controller by the client side gateway and the server side gateway.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
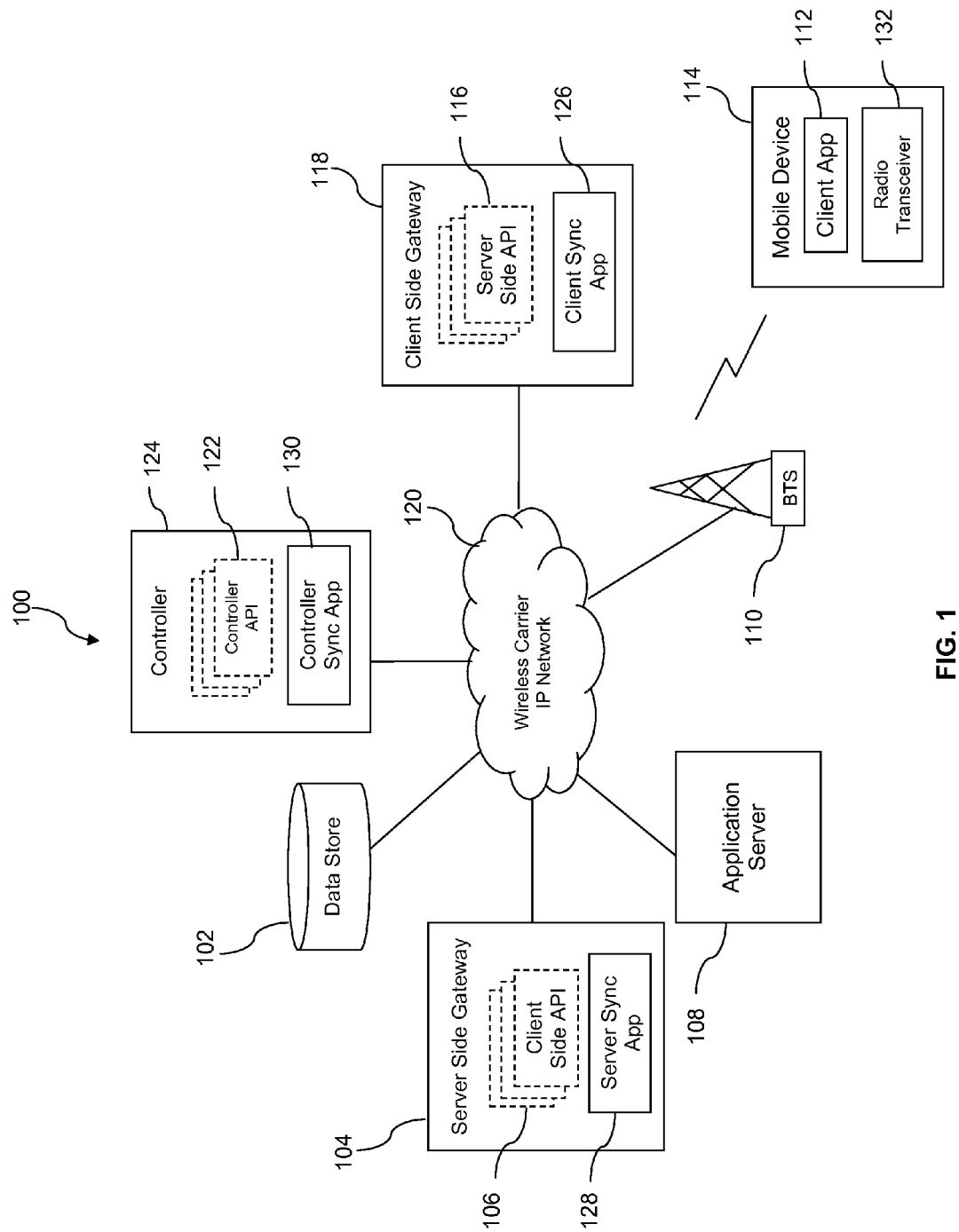
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Current interactive augmented reality applications, for example online augmented reality games, depend on a traditional client server streaming mechanism. The paradigm may be subject to issues of lag. Online augmented reality games simulate real world experience with illusion of contemporaneous play and illusion of contemporaneous play depends on low time lag of information sharing. A client may receive the current world state from the server and generates video and audio output based on these updates. The client may sample data from input devices (microphone, keyboard, mouse, etc.) and send these input samples to the server for further processing. With multiple clients, the server may process updates from different clients and update the current world state with those updates. Thus, low time lag of information sharing may be desirable in online augmented reality games for real world simulation.

Most lag-reducing solutions simulate the effects of real time content delivery via methods such as synchronization, interpolation, prediction, or time compensation. Bandwidth limitations, network latencies, or packet loss may cause information loss and cause a laggy gameplay feeling and make it more difficult to hit other players or interact with moving objects. Wireless networks are vulnerable to quality fluctuation, for example throughput fluctuation, jitter, or another type of quality fluctuation, and may suffer from bandwidth limitations, network latencies, or packet loss. Jitter is the variation in time between packets arriving in communication networks, caused by network congestion, time drift, route changes, or another reason. Thus wireless networks may amplify lag problems to online augmented reality game players. Game players with poor network quality, for example with a poor wireless network connection, may experience a laggy gameplay feeling and may even be kicked out of the game by a gaming server.

Current gaming devices may set up a fixed synchronization rate, for example a tickrate, with a gaming server at initialization without changing the rate later. A game server may send updates to gaming device(s) with the fixed tickrate. With poorer network conditions, for example a longer ping period, lower tickrate may be more desirable. A ping period is the round trip time for messages sent from the originating host to a destination computer to return to the originating host. For example, for an online augmented reality game, a ping is the time between a client sending a user command, the server responding to it, and the client receiving the server's response. A game server may simulate the game in discrete time steps called ticks. A tickrate is a rate of ticks and during each tick, the application server processes client commands, runs a physical simulation step, checks application rules, and updates object states. For example, the application server may advance the state of the game environment by one cycle, one iteration, or one tick time period. The application server processes all inputs from game players during a recent cycle or tick time period and updates all players with the next state of the game.

Most current online gaming providers base timing and synchronization only on ping, but a network communication service provider, or a carrier, can base it on network quality measurements and predictions of network state that only a carrier may know. Also, if some application programming interfaces (APIs) relevant to the online augmented reality game can be executed, intercepted, and interpreted by servers deployed in the wireless carrier internet protocol (IP) network, latency and lag issues may be better solved and a faster, more realistic user experience may be achieved. An application programming interface function may be a function provided by an application programming interface. Application programming interfaces and application programming interface functions may be interchangeable herein. The present disclosure teaches a system and method for monitoring network quality and moving synchronization and application programming interface execution to the edge of a wireless carrier internet protocol network.

For example, a client side server/gateway and a server side server/gateway may be deployed at the edge of a wireless carrier internet protocol network. The client side gateway may be physically close in the wireless carrier internet protocol network to a device executing a client application or an online augmented reality game player, and the server side gateway may be physically close to an application server or the online augmented reality game server. A controller may also be deployed in the wireless carrier internet protocol network and may be coupled to a data store. The controller may determine and oversee timing and synchronization between different nodes in the system and dynamically determine which application programming interfaces may be executed locally. The controller may further determine which application programming interfaces may be executed on the client side gateway, the server side gateway, the controller, or a separate server equidistant from the client side gateway, the server side gateway, and the controller.

The data store may keep records for timing and synchronization for the online augmented reality game system. The controller may initialize timing and synchronization, for example a tickrate, with timing and synchronization information obtained from the data store. The client side gateway may establish timing and synchronization between the client and the client side gateway in response to a request from the controller. The server side gateway may establish timing and synchronization between the application server and the server side gateway in response to a request from the controller.

The client/server side gateway may adjust the local timing and synchronization based on local environment, for example local network quality, network delay, network load, or network traffic, before a predefined period of time expires. The predefined period of time, or a threshold, may be different for the client side gateway and the server side gateway. The client/server side gateway may send the timing and synchronization decisions to the controller. After the threshold expires, the client/server side gateway may return the right to determine on the timing and synchronization to the controller.

The controller may determine which application programming interfaces are to be executed on the client side gateway, the server side gateway, the controller, or a separate server. The client/server side gateway may compress and transmit execution results of locally executed application programming interfaces to the controller. The controller may transmit the execution results to the other end of the path of the client/server side gateway. The server/client side gateway may decompress the execution results and update their internal state accordingly.

For application programming interface functions that can only be executed and then transmitted end-to-end, for example application programming interface functions that can only be executed on the mobile device and then transmitted from the mobile device to the application server, the client/server side gateway may compress data from the application programming interfaces and deliver to the other end with proper timing and synchronization, for example with the lowest tickrate of the different segments of the online augmented reality game system network. A library of application programming interfaces can support multiple users, multiple application servers, and multiple independent threads of execution although one user, one application server, and one thread of execution is discussed in this disclosure.

Turning now to FIG. 1, a communication system 100 is described. In an embodiment, the communication system 100 comprises a server side gateway 104, an application server 108, a client side gateway 118, and a controller 124. The server side gateway 104 may comprise a server synchronization application 128 and a plurality of client side application programming interfaces (APIs) 106. An application programming interface function may be a function provided by an application programming interface. Application programming interfaces and application programming interface functions may be interchangeable herein. The client side gateway 118 may comprise a client synchronization application 126 and a plurality of server side application programming interfaces (APIs) 116. The controller 124 may be coupled to a data store 102 and may comprise a controller synchronization application 130 and a plurality of controller application programming interfaces 122. The data store 102, the server side gateway 104, the application server 108, the client side gateway 118, and the controller 124 are coupled to a wireless carrier internet protocol (IP) network 120. The wireless carrier IP network 120 may be a network provided by a network communication services provider, or a carrier.

The communication system 100 further comprises a plurality of mobile communication devices 114. The mobile communication device 114 may comprise a radio transceiver 132 and a client application 112. The client application 112 may be client application(s) of an interactive augmented reality application, for example an online augmented reality game. The application server 108 may be a server from the interactive augmented reality application services provider, for example an online gaming services provider that runs server side application(s) for the online augmented reality game. The mobile communication device 114 is configured to use the radio transceiver 132 to establish a wireless communication link with a base transceiver station (BTS) 110, and the base transceiver station 110 provides communications connectivity of the mobile communication device 114 to the wireless carrier IP network 120.

It is understood that the communication system 100 may comprise any number of mobile communication devices 114, any number of client side gateways 118, any number of application servers 108, any number of base transceiver stations 110, and any number of server side gateways 104. The mobile communication devices 114 may be any of a mobile phone, a personal digital assistant (PDA), a media player, a laptop computer, a tablet computer, a game console, a notebook computer, or another wireless network/communications capable device. In an embodiment, the mobile communication device 114 may be a gaming device. It is understood that a gaming device may not be communicatively coupled to the wireless carrier IP network 120 through a wireless link, but may instead access the wireless carrier IP network 120 through a wired link. The client side gateway 118, the application server 108, the server side gateway 104, or the controller 124 may be any of a desktop computer, a server computer, or another network capable device. The client side gateway 118, the server side gateway 104, or the controller 124 may be part of the wireless carrier IP network 120. For example, the client side gateway 118, the server side gateway 104, or the controller 124 may be servers from a network communication services provider.

The client side gateway 118, the application server 108, the server side gateway 104, or the controller 124 may access the wireless carrier IP network 120 through a wired access network. The mobile communication device 114 may access the wireless carrier IP network 120 through a wireless access network. The wired access network may be abstracted in different ways and may comprise cable modems and Ethernet routers, switches, or hubs. The wireless access network may also be abstracted in different ways and may comprise wireless access points, cable modems, Ethernet or wireless routers, switches, or hubs, servers and data storages such as home location registers (HLRs) or servers that implement the functionality of home location registers, visitor location registers (VLRs) or servers that implement the functionality of visitor location registers, base transceiver stations, base station controllers (BSCs), mobile switching centers (MSCs), and other network nodes that are specifically associated with providing wireless access and connectivity to the mobile devices and the server computers.

In an embodiment, the data store 102 may keep records for compression rate, timing and synchronization information, and historical information on network traffic. For example, the data store 102 may store information to initialize the timing and synchronization of the online augmented reality game system. The controller 124 may access the data store 102 for the initialization timing and synchronization information to initialize the timing and synchronization of the online augmented reality game system. The data store 102 may update the records for timing and synchronization when timing and synchronization rates are adjusted by different components of the communication system 100, for example the server side gateway 104, the client side gateway 118, or the controller 124. The data store 102 may update the data store 102 with compression rates when compression rates are changed by the server side gateway 104 or the client side gateway 118. Additionally, the data store 102 may send historical information on network traffic to the server side gateway 104, the client side gateway 118, or the controller 124, and future network state may be predicted based on the historical information on the network traffic. Gaming parameters, such as timing and synchronization rates may be adapted based on the prediction.

The client side gateway 118 may be at the edge of the wireless carrier IP network 120 close to a mobile communication device 114, for example physically close to the mobile communication device 114. The client side gateway 118 may monitor the network between the client side gateway 118 and the mobile communication device 114. For example, the client side gateway 118 may monitor the network load, network traffic, and network delay of the local network. For example, wireless network delay between the client side gateway 118 and the mobile communication device 114 may be measured, for example with a loopback measurement technique. As another example, the client side gateway 118 may take quality measurements of the network between the client side gateway 118 and the mobile communication device 114. For instance, signal to noise ratio (SNR), received signal strength (RSS), quality of service (QoS), class of service (CoS), channel quality indicator (CQI), or another type of network quality parameter may be measured at the base transceiver station(s) 110 and/or at the mobile communication device 114 for adapting the timing and synchronization. The network measurements from the base transceiver station(s) 110 and/or the mobile communication device 114 may be obtained by the client side gateway 118. Additionally, the client side gateway 118 may predict network performance based on historical network performance and/or the measured network quality parameters. The client side gateway 118 may obtain/receive historical network traffic information from the data store 102 and predict future network performance. For example, the client side gateway 118 may predict a higher traffic load on a Friday night based on historical Friday night busy traffic on the network between the client side gateway 118 and the mobile communication device 114. Based on the measured network quality parameters and predicted network performance, the client synchronization application 126 on the client side gateway 118 may determine the timing and synchronization rate between the client side gateway 118 and the mobile communication device 114, for example a tickrate from the client side gateway 118 to the mobile communication device 114, based on predefined rules.

The client synchronization application 126 may establish and/or adjust timing and synchronization between the client side gateway 118 and the mobile communication device 114. For example, the client synchronization application 126 may establish the timing and synchronization between the client side gateway 118 and the mobile communication device 114 at initialization, for example when the mobile communication device 114 started the online augmented reality game. The client synchronization application 126 may first request timing and synchronization information from the controller 124. Based on the requested timing and synchronization information, the client synchronization application 126 may set the timing and synchronization rate between the client side gateway 118 and the mobile communication device 114, for example the tickrate from the client side gateway 118 to the mobile communication device 114. Additionally, the client synchronization application 126 may adjust the timing and synchronization rate based on the measured network quality parameters and predicted network performance information. For example, the client synchronization application 126 may increase or decrease the tickrate by one step or proportionally based on the measured network quality parameters and predicted network performance information. Also, the carrier may promote service upgrade to the user if the wireless signal quality is insufficient to support the application via sending a prompt message to the user by the client side gateway 118. The server synchronization application 128 may establish and/or adjust timing and synchronization between the server side gateway 104 and the application server 108 similarly to how the client synchronization application 126 establishes and/or adjusts timing and synchronization between the client side gateway 118 and the mobile communication device 114.

The server side gateway 104 may be at the edge of the wireless carrier IP network 120 close to an application server 108, for example physically close to the application server 108. The network between the server side gateway 104 and the application server 108 may be a wired network. The server side gateway 104 may monitor the network between the server side gateway 104 and the application server 108. For example, the server side gateway 104 may take quality measurements of the network between the server side gateway 104 and the application server 108. For example, techniques may be used to characterize network quality, for example a time domain reflectometry (TDR) to measure a wired network delay, between the server side gateway 104 and the application server 108 for determining the timing and synchronization. For example, a ping may be sent from the server side gateway 104 to the application server 108 to determine the round trip time for messages sent from the server side gateway 104 to the application server 108 and to return to the server side gateway 104.

Additionally, the server side gateway 104 may predict network performance based on historical network performance and/or the measured network quality parameters. The server side gateway 104 may obtain/receive historical network traffic information from the data store 102 and predict future network performance. For example, the server side gateway 104 may predict a higher traffic load based on increasing traffic load on a Saturday night. Based on the measured network quality parameters and predicted network performance, the server synchronization application 128 on the server side gateway 104 may determine the timing and synchronization rate between the server side gateway 104 and the application server 108, for example a tickrate from the server side gateway 104 to the application server 108. Different tickrates for different segments of the online augmented reality game system may concurrently be suggested by the client side gateway 118, the server side gateway 104, and/or the controller 124. For example, the tickrate from the server side gateway 104 to the application server 108, the tickrate from the client side gateway 118 to the mobile communication device 114, the tickrate from the controller 124 to the client side gateway 118, and the tickrate from the controller 124 to the server side gateway 104 may be different from each other.

The autonomous decision on the local timing and synchronization by the client/server side gateway 118/104 may be conducted within a predefined period of time, for example within a threshold. The threshold for the client side gateway 118 and the server side gateway 104 may be different. After the threshold expires, the client/server side gateway 118/104 may return the right to determine the local timing and synchronization to the controller 124.

Some application programming interface functions that are executed on the application server 108 relevant to the online augmented reality game may be executed locally, for example on the server side gateway 104, on the client side gateway 118, on the controller 124, or on a separate server (not shown in FIG. 1). The separate server may be equidistant from the server side gateway 104, the client side gateway 118, and the controller 124. By executing at least some of the application programming interface functions locally, network resources and/or computing resources may be better utilized, lag and/or jitter may be reduced, and thus better overall performance of the online augmented reality game may be achieved. The allocation of application programming interface function execution may be adapted dynamically. For example, one application programming interface function may be executed at the server side gateway 104 at the beginning of an online augmented reality game session, and then executed at the client side gateway 118 when some change occurs to the online augmented reality game system.

The server side application programming interfaces 116 may be preloaded on the client side gateway 118. For example, at least some server side application programming interfaces 116 that can be executed on the client side gateway 118 may be preloaded on the client side gateway 118. The preloaded server side application programming interfaces 116 may not be activated unless under some circumstances. For example, when network quality of either of the network between the server side gateway 104 and the application server 108, and the network between the server side gateway 104 and the controller 124 is below a predefined threshold, some of the preloaded server side application programming interfaces 116 may be executed locally. The execution results may be transmitted to the controller 124. For example, the execution results may be bundled and/or compressed, and transmitted from the client side gateway 118 to the controller 124. Some application programming interfaces may only be executed on either the mobile communication device 114 or the application server 108. The data from the application programming interfaces that can only be executed on the mobile communication device 114 may be compressed by the client side gateway 118 and transmitted to the application server 108 with proper timing and synchronization.

Similarly, the client side application programming interfaces 106 may be preloaded on the server side gateway 104 and some of the preloaded client side application programming interfaces 106 may be executed locally under certain circumstances. For example, client side application programming interfaces 106 that can be executed on the server side gateway 104 may be preloaded on the server side gateway 104. The preloaded client side application programming interfaces 106 may not be activated except under some circumstances. For example, when network quality of either of the network between the client side gateway 118 and the mobile communication device 114, and the network between the client side gateway 118 and the controller 124 is below a predefined threshold, some of the preloaded client side application programming interfaces 106 may be executed locally on the server side gateway 104. The execution results may be transmitted to the controller 124. For example, the execution results may be bundled and compressed, and transmitted from the server side gateway 118 to the controller 124. The data from the application programming interfaces that can only be executed on the application server 108 may be compressed by the server side gateway 104 and transmitted to the mobile communication device 114 with proper timing and synchronization.

The controller 124 may oversee timing and synchronization and/or execution of some of application programming interfaces. The controller 124 may be notified of any change that the client/server side gateway 118/104 makes to the online augmented reality game system. In an embodiment, the controller 124 may initialize, establish, and dynamically determine timing and synchronization for the online augmented reality game system. The controller 124 may dynamically determine which application programming interfaces can be executed locally, for example on the server side gateway 104, on the client side gateway 118, on the controller 124, and on a separate server. For example, the controller 124 may be preloaded with application programming interfaces that can be executed on the controller 124. The preloaded controller application programming interfaces 122 may not be activated except under some circumstances. When the controller 124 determines which controller application programming interfaces 122 may be executed locally on the controller, the corresponding controller application programming interfaces 122 may be activated and executed.

For example, the controller 124 may initialize the timing and synchronization of the controller 124, the gateways 104/118, the mobile communication device 114, and the application server 108 based on the timing and synchronization information stored in the data store 102. For example, the controller 124 may access the data store 102 for the timing and synchronization initialization information. The controller 124 may initialize the timing and synchronization for different components. For example, the controller 124 may initialize the timing and synchronization between different nodes. Timing and synchronization rates between different nodes may vary. For example, timing and synchronization rate between the client side gateway 118 and the client application 112 may be different from timing and synchronization rate between the server side gateway 104 and the application server 108. For example, the controller 124 may initialize the timing and synchronization between the controller and the server side gateway 104. The controller 124 may initialize the timing and synchronization between the controller and the client side gateway 118. Additionally, the controller 124 may initialize end-to-end timing and synchronization between the client application 112 and the application server 108.

The controller 124 may initialize the timing and synchronization between the client side gateway 118 and the client application 112 or send a notification to the client side gateway 118 with initial timing and synchronization information. The client side gateway 118 may then initialize the timing and synchronization between the client application 112 and the client side gateway 118 the initial timing and synchronization information. Similarly, the controller 124 may initialize the timing and synchronization between the server side gateway 104 and the application server 108 or send a notification to the server side gateway 104 with initial timing and synchronization information. The server side gateway 104 may then initialize the timing and synchronization between the client application 112 and the client side gateway 118 with the initial timing and synchronization information.

The controller 124 may adjust the timing and synchronization based on network measurements and/or predicted network performance, for example via the controller synchronization application 130. The controller 124 may obtain/receive historical network traffic information from the data store 102 and predict future network performance. For example, if more wireless clients join the same interactive space, the controller 124 may dynamically determine the synchronization between the client side gateway 118 and the server side gateway 104. As another example, when network quality changes in any of the networks between all nodes, the controller 124 may be notified. The controller 124 may adjust the timing and synchronization accordingly. For example, when the network quality between the server side gateway 104 and the application server 108 falls below a predefined threshold, the server side gateway 104 may send a notice to the controller 124 with the updated network quality information. The controller 124 may adjust the timing and synchronization rate between the server side gateway 104 and the application server 108 by directly changing the rate with the server synchronization application 128 and/or by sending a notice with the updated rate. Additionally, the controller 124 may calculate a synchronization and timing error between all nodes and correct accordingly, for example by adjusting synchronization and timing rate(s).

The controller 124 may first determine which application programming interfaces can be executed locally in general, for example on the server side gateway 104, on the client side gateway 118, on the controller 124, and on a separate server. The controller 124 may further determine which application programming interfaces may be executed on each of the nodes based on a variety of reasons, for example based on measured network quality and/or predicted network performance. The controller 124 may dynamically determine which application programming interfaces may be executed on each of the nodes under certain circumstances. For example, if more wireless clients join the same interactive space, the controller 124 may dynamically determine which application programming interfaces may be executed on the server side gateway 104, on the client side gateway 118, on the controller 124, or on a separate server.

Execution results of the locally executed application programming interfaces that can be executed on either the server side gateway 104 or the client side gateway 118 may be transmitted back to the controller 124. For example, client execution results from the server side application programming interfaces 116 may be transmitted from the client side gateway 118 to the controller 124. The controller 124 may transmit the client results to the server side gateway 104. The server side gateway 104 may unbundle and decompress the client results from the controller 124. Similarly, application server execution results from the client side application programming interfaces 106 may be transmitted from the server side gateway 104 to the controller 124. The controller 124 may transmit the application server results to the client side gateway 118. The client side gateway 118 may unbundle and decompress the application server results from the controller 124. The client/server side gateway 118/104 may send an updated compression rate to the controller 124. The controller 124 may then update the data store with the compression rates. Additionally, state of the locally executed application programming interfaces may be updated by the controller 124 to match internal state at the other end. For example, the state of the server side application programming interfaces 116 may be updated by the controller 124 to match the internal state of the client side application programming interfaces 106. The state of the client side application programming interfaces 106 may be updated by the controller 124 to match the internal state of the server side application programming interfaces 116.

For application programming interfaces that can only be executed on one side and may desire to be transmitted end-to-end, the controller 124 may bundle and compress data from the application programming interfaces and deliver from end-to-end with proper timing and synchronization.

Figure 2A:
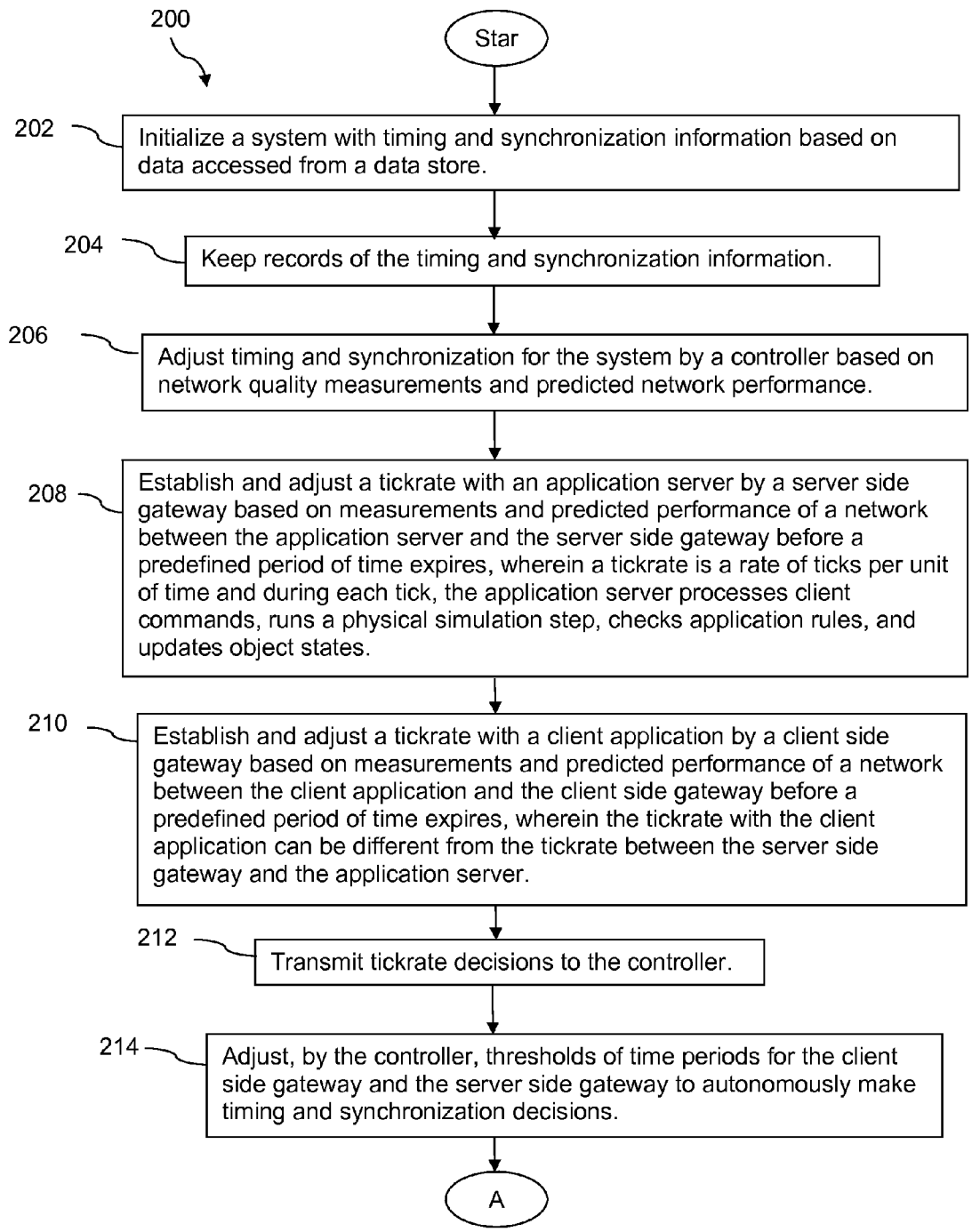
FIG. 2A and FIG. 2B is a flow chart illustrating a method according to an embodiment of the disclosure.
Figure 2B:
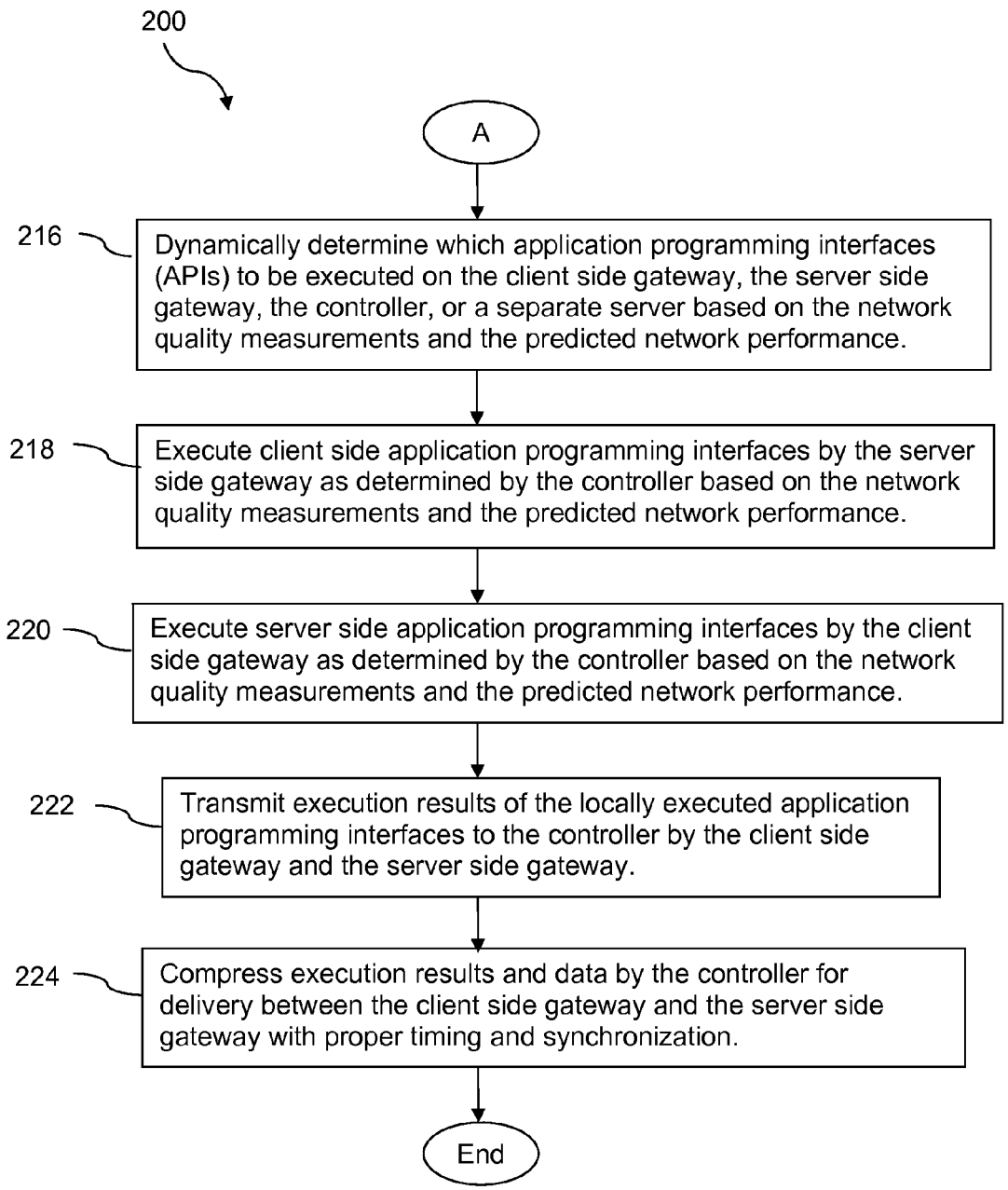

Turning now to FIG. 2A and FIG. 2B, a method 200 is described. At block 202, a system is initialized with timing and synchronization information based on data accessed from a data store. For example, an online augmented reality game system may be initialized with timing and synchronization information based on data accessed from a data store 102. In an embodiment, the controller 124 may access the data store 102 for the timing and synchronization initialization information and initialize the system with the acquired information. At block 204, records of the timing and synchronization information are kept. For example, records of the timing and synchronization information are kept in the data store 102. For example, when any of the timing and synchronization rates in the online augmented reality game system is changed, the controller 124 may send a notice to the data store 102 with the updated timing and synchronization rate. The data store 102 may then update the record for that timing and synchronization rate.

At block 206, timing and synchronization is adjusted for the system by a controller based on network quality measurements and predicted network performance. For example, the controller 124 may adjust timing and synchronization for the online augmented reality game system based on network quality measurements and predicted network performance. The network quality measurements and predicted network performance may be obtained from the client side gateway 118 and the server side gateway 104.

At block 208, a tickrate is established and adjusted with an application server by a server side gateway based on measurements and predicted performance of a network between the application server and the server side gateway before a predefined period of time expires, wherein a tickrate is a rate of ticks per unit of time and during each tick, the application server processes client commands, runs a physical simulation step, checks application rules, and updates object states. For example, a tickrate may be established by the server side gateway 104 based on measurements and predicted performance of the network between the application server 108 and the server side gateway 104. Before a predefined period of time, a threshold, expires, the server side gateway 104 may autonomously make decisions on the tickrate. When the predefined period of time expires, the server side gateway 104 may return the right to the controller 124 to make decisions on the tickrate.

At block 210, a tickrate is established and adjusted with a client application by a client side gateway based on measurements and predicted performance of a network between the client application and the client side gateway before a predefined period of time expires, wherein the tickrate with the client application can be different from the tickrate between the server side gateway and the application server. Similar to the tickrate between the application server 108 and the server side gateway 104, a tickrate between the mobile communication device 114 and the client side gateway 118 may be determined by the client side gateway 118 before a predefined period of time, a threshold, expires. The threshold for the client side gateway 118 may be different from the threshold for the server side gateway 104. Also, when the predefined period of time expires, the client side gateway 118 may return the right to the controller 124 to make decisions on the tickrate.

At block 212, tickrate decisions are transmitted to the controller. For example, tickrate decisions made by the client side gateway 118 and the server side gateway 104 may be transmitted to the controller 124 so that the controller 124 may oversee the tickrates for the online augmented reality game system. The controller may then update the data store 102 with the timing and synchronization information accordingly. At block 214, thresholds of time periods are adjusted by the controller for the client side gateway and the server side gateway to autonomously make timing and synchronization decisions. For example, the controller 124 may adjust the threshold for the server side gateway 104 or the client side gateway 118 to autonomously determine a tickrate when the network at the server side gateway 104 or the client side gateway 118 fluctuates at a frequency higher than a predefined amount. At block 216, which application programming interfaces (APIs) to be executed on the client side gateway, the server side gateway, the controller, or a separate server based on the network quality measurements and the predicted network performance are dynamically determined. For example, the controller 124 may dynamically determine which application programming interfaces are to be executed on the client side gateway 118, the server side gateway 104, the controller 124, or a separate server based on the network quality measurements and the predicted network performance. For example, during the process of a user playing the online augmented reality game, the controller 124 may reassign the application programming interfaces to be executed on the client side gateway 118, the server side gateway 104, the controller 124, or the separate server to accommodate the online augmented reality game system to network quality change.

At block 218, client side application programming interfaces are executed by the server side gateway as determined by the controller based on the network quality measurements and the predicted network performance. For example, the server side gateway 104 may execute the client side application programming interfaces 106 that are determined by the controller 124 to be executed locally on the server side gateway 104. At block 220, server side application programming interfaces are executed by the client side gateway as determined by the controller based on the network quality measurements and the predicted network performance. Similarly, the client side gateway 118 may execute the server side application programming interfaces 116 that are determined by the controller 124 to be executed locally on the client side gateway 118. At block 222, execution results of the locally executed application programming interfaces are transmitted to the controller by the client side gateway and the server side gateway. For example, execution results of the application programming interfaces that are executed on the client side gateway 118 and the server side gateway 104 may be transmitted to the controller 124. At block 224, execution results and data are compressed by the controller for delivery between the client side gateway and the server side gateway with proper timing and synchronization. For example, the controller 124 may compress execution results and data from one of the client side gateway 118 and the server side gateway 104 to send to the other.

Figure 3:
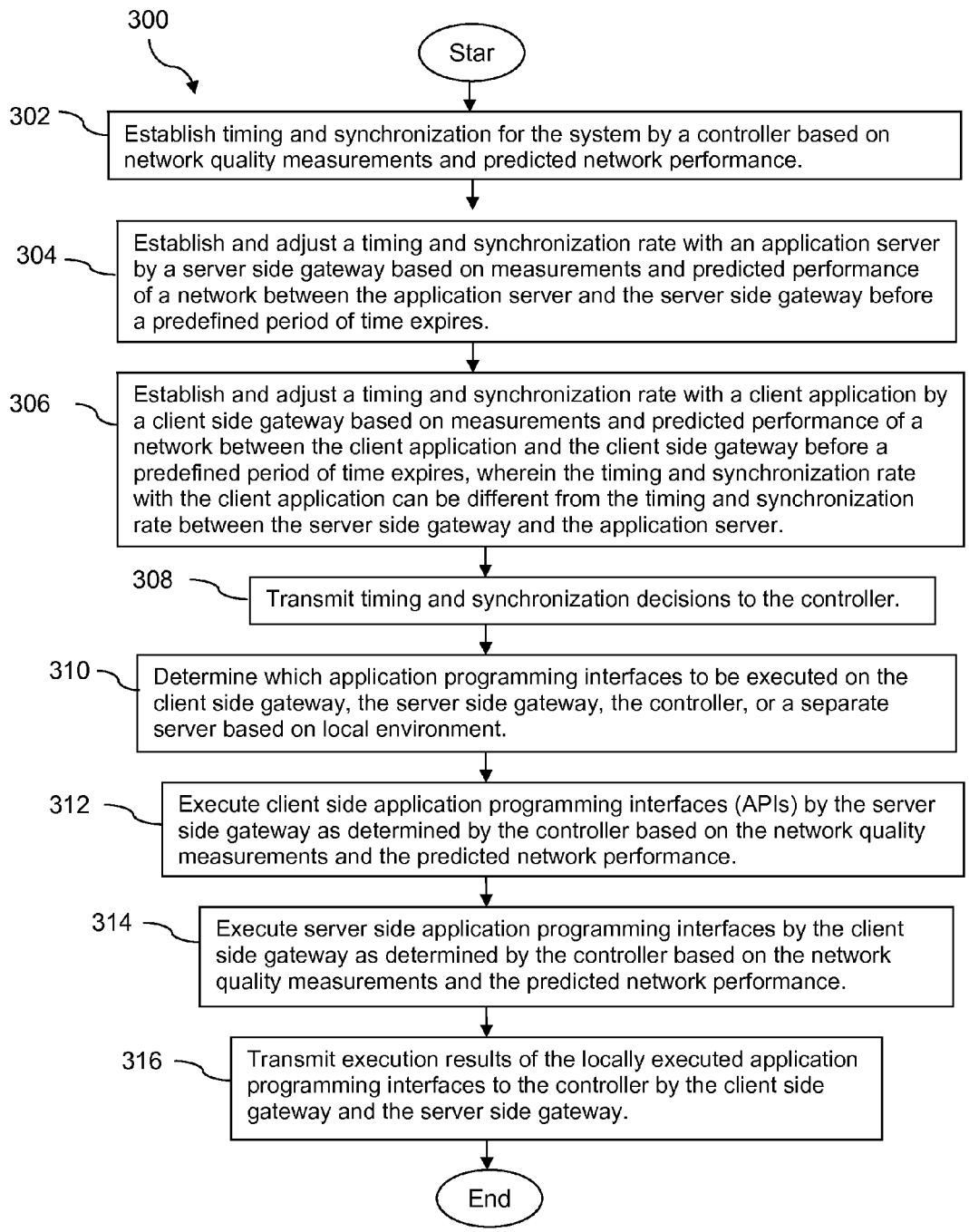
FIG. 3 is a flow chart illustrating another method according to an embodiment of the disclosure.

Turning now to FIG. 3, a method 300 is described. At block 302, timing and synchronization for the online augmented reality game system is established by a controller 124 based on network quality measurements and predicted network performance. At block 304, a timing and synchronization rate with an application server 108 is established and adjusted by a server side gateway 104 based on measurements and predicted performance of a network between the application server 108 and the server side gateway 104 before a predefined period of time expires. At block 306, a timing and synchronization rate with a client application 112 is established and adjusted by a client side gateway 118 based on measurements and predicted performance of a network between the client application 112 and the client side gateway 118 before a predefined period of time expires, wherein the timing and synchronization rate with the client application 112 can be different from the timing and synchronization rate between the server side gateway 104 and the application server 108.

At block 308, timing and synchronization decisions are transmitted to the controller 124. At block 310, which application programming interfaces to be executed on the client side gateway 118, the server side gateway 104, the controller 124, or a separate server are determined based on local environment. At block 312, client side application programming interfaces (APIs) 106 are executed by the server side gateway 104 as determined by the controller 124 based on the network quality measurements and the predicted network performance. At block 314, server side application programming interfaces 116 are executed by the client side gateway 118 as determined by the controller 124 based on the network quality measurements and the predicted network performance. At block 316, execution results of the locally executed application programming interfaces are transmitted to the controller 124 by the client side gateway 118 and the server side gateway 104.

Figure 4:
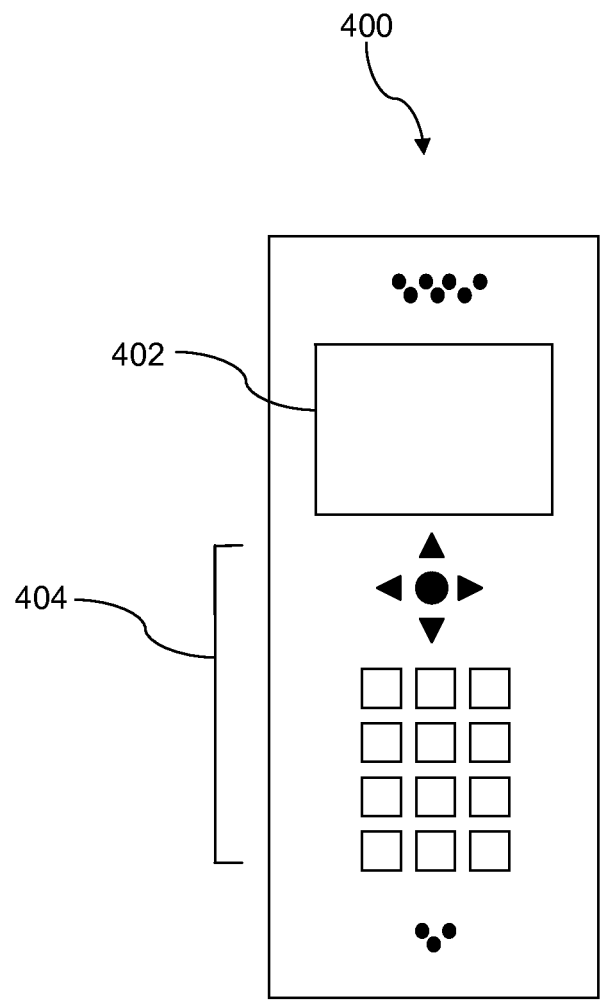
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. For example, in an embodiment, the mobile communication device 114 may be implemented in a form and/or structure similar to the mobile device 400. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
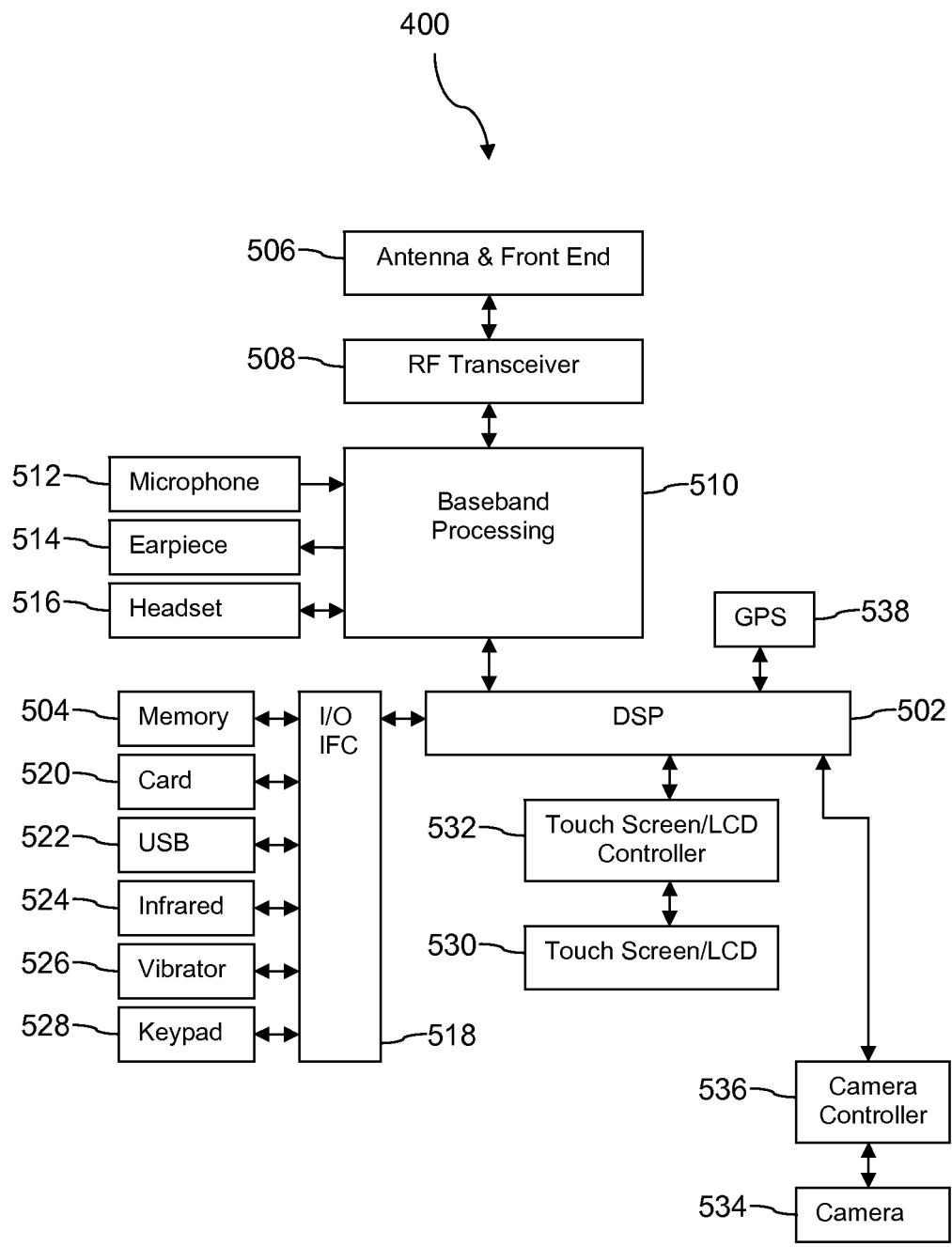
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
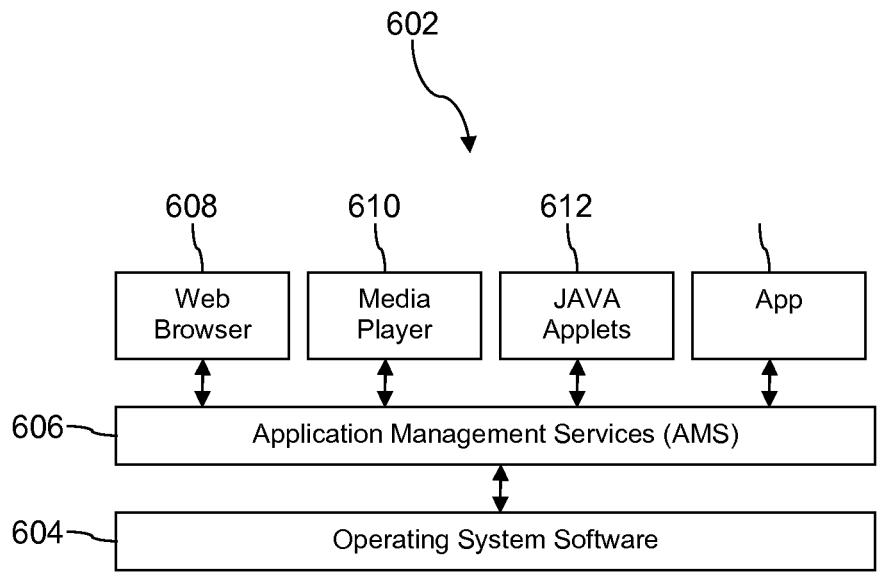
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
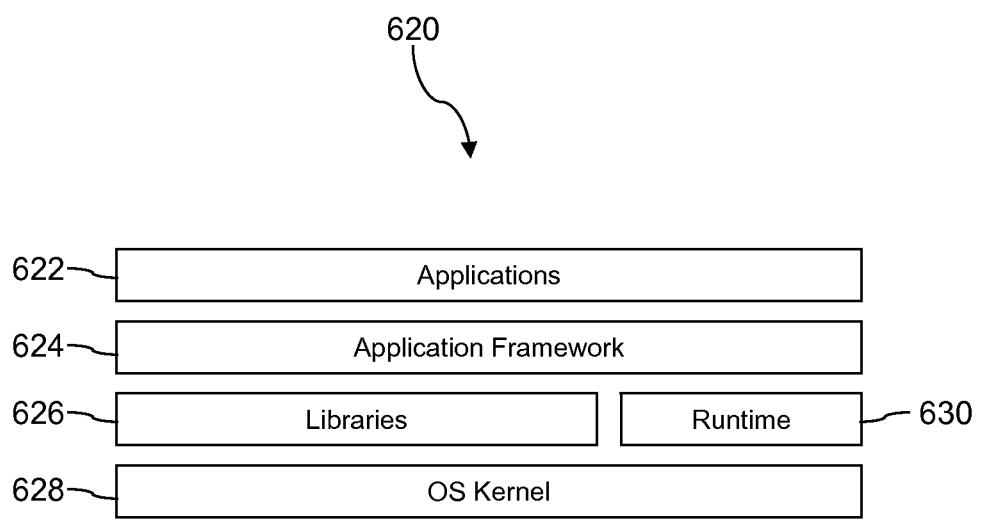
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
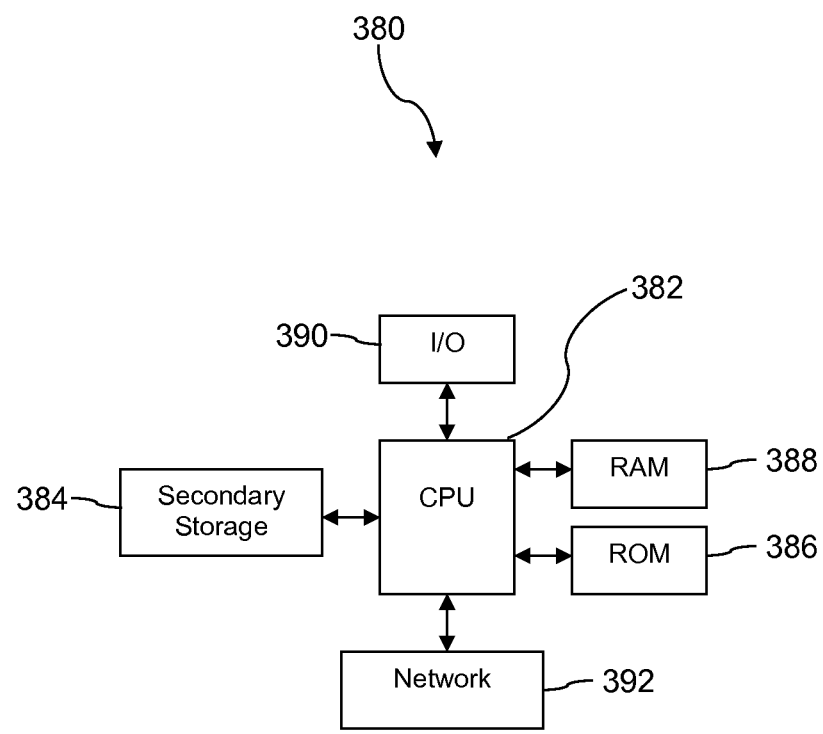
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets.

With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for improving performance of an interactive augmented reality application over a wireless network, comprising:
   at least one server side gateway configured to:
      determine measurements and predicted performance of a server side network between an application server and the server side gateway,
      establish and adjust timing and synchronization with the application server based on the determined measurements and predicted performance of the server side network before a server side predefined period of time expires,
      transmit the timing and synchronization decision to a controller,
      execute client side application programming interfaces (APIs) determined by the controller based on the determined measurements and predicted performance of the network between the application server and the server side gateway, and
      transmit execution results of the client side APIs to the controller;
   at least one client side gateway configured to:
      determine measurements and predicted performance of a client side network between a client application and the client side gateway,
      establish and adjust timing and synchronization with the client application based on the determined measurements and predicted performance of the client side network before a client side predefined period of time expires,
      transmit the timing and synchronization decision to the controller,
      execute server side APIs determined by the controller based on the determined measurements and predicted performance of the network between the client application and the client side gateway, and
      transmit execution results of the server side APIs to the controller; and
   the controller configured to:
      initialize, establish, and dynamically determine timing and synchronization for the system based on network quality measurements and predicted network performance of different networks in the system including the determined measurements and predicted performance of the server side network and the determined measurements and predicted performance of the client side network,
      dynamically determine which APIs to be executed on the client side gateway, the server side gateway, the controller, or a separate server based on the network quality measurements and the predicted network performance,
      adjust thresholds of time periods for the client side gateway and the server side gateway to autonomously make timing and synchronization decisions, and
      transmit execution results and data between the client side gateway and the server side gateway with proper timing and synchronization.

2. The system of claim 1, further comprising a data store that keeps records of timing and synchronization information based on measurements of wired network delay and wireless network delay.

3. The system of claim 2, wherein the data store updates the records of the timing and synchronization information based on predicted wireless network load, traffic, and delay.

4. The system of claim 3, wherein the data store updates rate of compression based on the measured wired network delay, wireless network delay, predicted wireless network load, traffic, delay, and application type of an application.

5. The system of claim 1, wherein the server side gateway bundles and compresses the execution results of the client side APIs and sends the execution results to the controller.

6. The system of claim 1, wherein the server side gateway unbundles and decompresses client results from the controller.

7. The system of claim 1, wherein the client side gateway bundles and compresses the execution results of the server side APIs and sends the execution results to the controller.

8. The system of claim 1, wherein the client side gateway unbundles and decompresses application server results from the controller.

9. A method of improving performance of a real time application over a wireless network, comprising:
   initializing a system with timing and synchronization information based on data accessed from a data store;
   keeping records of the timing and synchronization information;
   adjusting timing and synchronization for the system by a controller based on network quality measurements and predicted network performance;
   determining, by a server side gateway, measurements and predicted performance of a server side network between an application server and the server side gateway;
   establishing and adjusting, by the server side gateway, an application server tickrate with the application server based on the determined measurements and predicted performance of the server side network before a server side predefined period of time expires, wherein the application server tickrate is a rate of ticks per unit of time and during each tick, the application server processes client commands, runs a physical simulation step, checks application rules, and updates object states;
   determining, by a client side gateway, measurements and predicted performance of a client side network between a client application and a client side gateway;
   establishing and adjusting, by the client side gateway, a client application tickrate with the client application based on the determined measurements and predicted performance of the client side network before a client side predefined period of time expires, wherein the client application tickrate is the same or different from the application server tickrate;
   transmitting the application server tickrate and the client application tickrate to the controller;
   adjusting, by the controller, thresholds of time periods for the client side gateway and the server side gateway to autonomously make timing and synchronization decisions;
   dynamically determining which application programming interfaces (APIs) to be executed on the client side gateway, the server side gateway, the controller, or a separate server based on network quality measurements and predicted network performance including the determined measurements and predicted performance of the server side network and the determined measurements and predicted performance of the client side network;
   executing client side APIs by the server side gateway as determined by the controller based on the network quality measurements and the predicted network performance;
   executing server side APIs by the client side gateway as determined by the controller based on the network quality measurements and the predicted network performance;
   transmitting execution results of the executed client side and server side APIs to the controller by the client side gateway and the server side gateway; and
   compressing execution results and data by the controller for delivery between the client side gateway and the server side gateway with proper timing and synchronization.

10. The method of claim 9, wherein the controller bundles and compresses execution results for delivery between the client side gateway and the server side gateway for APIs that can be executed on either the client side gateway or the server side gateway.

11. The method of claim 9, wherein the controller bundles and compresses data for delivery between the client side gateway and the server side gateway for APIs that can be executed on only one of the client side gateway and the server side gateway with proper timing and synchronization.

12. The method of claim 9, wherein when the client side predefined period of time expires, the client side gateway stops making decisions regarding the client application tickrate and instead the controller makes the decisions regarding the client application tickrate.

13. The method of claim 9, wherein tickrates from the controller, the client side gateway, or the server side gateway are different.

14. The method of claim 13, wherein network performance at a base transceiver station and a mobile device is monitored to adjust the client application tickrate between the mobile device and the client side gateway.

15. The method of claim 14, wherein predicted network performance at the base transceiver station and the mobile device is used to adjust the client application tickrate between the mobile device and the client side gateway.

16. The method of claim 14, wherein the mobile device is one of mobile phone, a personal digital assistant (PDA), a media player, a laptop computer, a tablet computer, a game console, or a notebook computer.

17. The method of claim 16, wherein the mobile device is provided with radio communications by a radio frequency transceiver within the mobile communication device based on at least one of code division multiple access (CDMA), global system for mobile communication (GSM), long term evolution (LTE), or worldwide interoperability for microwave access (WiMAX) wireless communication protocols.

18. A method of improving performance of a real time application over a wireless network, comprising:
   establishing timing and synchronization for a system by a controller based on network quality measurements and predicted network performance;
   determining, by a server side gateway, measurements and predicted performance of a server side network between an application server and the server side gateway;
   establishing and adjusting, by the server side gateway, a timing and synchronization rate with the application server based on the determined measurements and predicted performance of the server side network before a server side predefined period of time expires;

determining, by the client side gateway, measurements and predicted performance of a client side network between a client application and a client side gateway;

establishing and adjusting, by the client side gateway, a timing and synchronization rate with the client application based on the determined measurements and predicted performance of the client side network before a client side predefined period of time expires, wherein the timing and synchronization rate with the client application is the same or different from the timing and synchronization rate between the server side gateway and the application server;

transmitting timing and synchronization decisions to the controller;

determining which application programming interfaces (APIs) to be executed on the client side gateway, the server side gateway, the controller, or a separate server based on local environment;

executing client side APIs by the server side gateway as determined by the controller based on network quality measurements and predicted network performance including the determined measurements and predicted performance of the server side network and the determined measurements and predicted performance of the client side network;

executing server side APIs by the client side gateway as determined by the controller based on the network quality measurements and the predicted network performance; and transmitting execution results of the executed client side and server side APIs to the controller by the client side gateway and the server side gateway.

19. The method of claim 18, wherein the client side gateway and the server side gateway are preloaded with APIs and some of the preloaded APIs are executed as determined by the controller based on the network quality measurements and predicted network performance.

20. The method of claim 18, wherein the APIs are dynamically determined by the controller to be executed on the controller, the client side gateway, the server side gateway, or the separate server equidistant from the controller, the client side gateway, and the server side gateway based on the local environment.

* * * * *